(12) United States Patent
Li et al.

(10) Patent No.: US 9,753,951 B1
(45) Date of Patent: *Sep. 5, 2017

(54) PRESENTING IMAGE SEARCH RESULTS

(71) Applicant: Google Inc., Mountain View, CA (US)

(72) Inventors: Yuan Li, Fremont, CA (US); Taehee Lee, Los Angeles, CA (US); Hartwig Adam, Los Angeles, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/220,671

(22) Filed: Jul. 27, 2016

Related U.S. Application Data

(63) Continuation of application No. 13/790,024, filed on Mar. 8, 2013, now Pat. No. 9,424,279.

(60) Provisional application No. 61/734,001, filed on Dec. 6, 2012.

(51) Int. Cl.
*G06F 17/30* (2006.01)

(52) U.S. Cl.
CPC .... *G06F 17/30277* (2013.01); *G06F 17/3025* (2013.01); *G06F 17/3053* (2013.01); *G06F 17/3087* (2013.01); *G06F 17/30247* (2013.01); *G06F 17/30256* (2013.01); *G06F 17/30268* (2013.01); *G06F 17/30554* (2013.01)

(58) Field of Classification Search
CPC .................................................. G06F 17/30247
See application file for complete search history.

(56) References Cited

U.S. PATENT DOCUMENTS

| | | | |
|---|---|---|---|
| 6,415,282 B1 | 7/2002 | Mukherjea et al. |
| 8,150,170 B2 | 4/2012 | Li et al. |
| 8,341,112 B2 | 12/2012 | Zhang et al. |
| 8,391,618 B1 | 3/2013 | Chuang et al. |
| 2005/0114325 A1 | 5/2005 | Liu et al. |
| 2008/0235724 A1 | 9/2008 | Sassenscheidt et al. |
| 2009/0204637 A1 | 8/2009 | Li et al. |
| 2009/0313294 A1 | 12/2009 | Mei et al. |
| 2009/0319883 A1 | 12/2009 | Mei et al. |
| 2010/0241946 A1 | 9/2010 | Ofek et al. |
| 2010/0299303 A1 | 11/2010 | Horster et al. |

*Primary Examiner* — Kris Mackes
(74) *Attorney, Agent, or Firm* — Fish & Richardson P.C.

(57) ABSTRACT

A system and computer-implemented method is provided for organizing multiple user submitted results responsive to an image query. A plurality of content submissions may be received from a variety of submitting users, each content submission including an image and an associated label. An image query may provide an image of an object as a request to identify the object. In response to receiving the image query, one or more results of the plurality of content submissions may be identified. A similarity between the labels for each of the one or more results may be determined and used to group the one or more results. Grouped results may be ranked and sorted for accurate and concise presentation to a querying user.

20 Claims, 8 Drawing Sheets

PRESENTING IMAGE SEARCH RESULTS

CROSS-REFERENCE TO RELATED APPLICATIONS

This application is a continuation of U.S. application Ser. No. 13/790,024, filed Mar. 8, 2013, which claims the benefit of the filing date of U.S. Provisional Patent Application No. 61/734,001 filed Dec. 6, 2012, the disclosure of which are hereby incorporated herein by reference.

BACKGROUND

The subject matter described herein generally relates to content serving systems that receive image results.

As more and more data is hosted on the Internet, new techniques have been developed for sorting, organizing, and accessing this information. One common tool is the Internet search engine, which may be used to search visual images. For example, a user may wish to identify a person in a photograph, an actor in a video, or a location on a map. Such scenarios require the user to identify a text query that approximates the contents of their image, often leading to inaccurate results. Other search engines may offer an image based search option, where a user may upload a target image to initiate a search based on features of the image.

SUMMARY

Aspects of the subject matter described herein provide a computer-implemented method for presenting image search results. This method includes receiving a number of content submissions, each content submission including an image and an associated label, receiving an image query, and identifying, using a processor, one or more results of the number of content submissions, the results having images corresponding to the image query. Further, a similarity between the labels for each of the one or more results may be determined, and the one or more results may be grouped based on the similarity of the labels. According to one example, the method may further include assigning an image match score to each of the one or more results, and assigning a group score to the grouped results, the group score being based on the image match scores of the results in the group. The groups may be ranked based on the group score, and sorted based on the rank. Moreover, the method may include determining geographic information relating to at least one of the image query and the one or more results, and adjusting the image match scores based on the geographic information. According to one example, the method may include identifying a user device associated with each of the plurality of content submissions, and limiting the one or more results such that at most one result from each user device is included in the results.

Another aspect of the subject matter described herein provides a system for presenting image search results. In this system, a memory stores a number of content submissions, each content submission including an image and an associated label. A processor in communication with the memory is configured to receive an image query, identify one or more results of the number of content submissions, the results having images corresponding to the image query, determine a similarity between the labels for each of the one or more results, and group the one or more results based on the similarity of the labels.

Yet another aspect of the subject matter described herein provides a non-transitory computer readable storage medium including instructions executable by a processor. When executed by the processor, the instructions cause the processor to perform a method including receiving a number of content submissions, each content submission including an image and an associated label. The method further includes receiving an image query, identifying one or more results of the plurality of content submissions, the results having images corresponding to the image query, determining a similarity between the labels for each of the one or more results, and grouping the one or more results based on the similarity of the labels.

DETAILED DESCRIPTION

User Generated Content (UGC) can be used as a method of improving object identification performance. For example, by adding user submitted images and annotations to an image matching index, the submitted annotations can be used as samples for training the index. Moreover, the user submitted images and annotations can be shown as visual search results to other users whose queries are matched to existing UGCs. However, because multiple users may submit annotations for a same image, the annotations may differ. Accordingly, a system and method is provided for improving how such visual search results are presented to a user.

Figure 1:
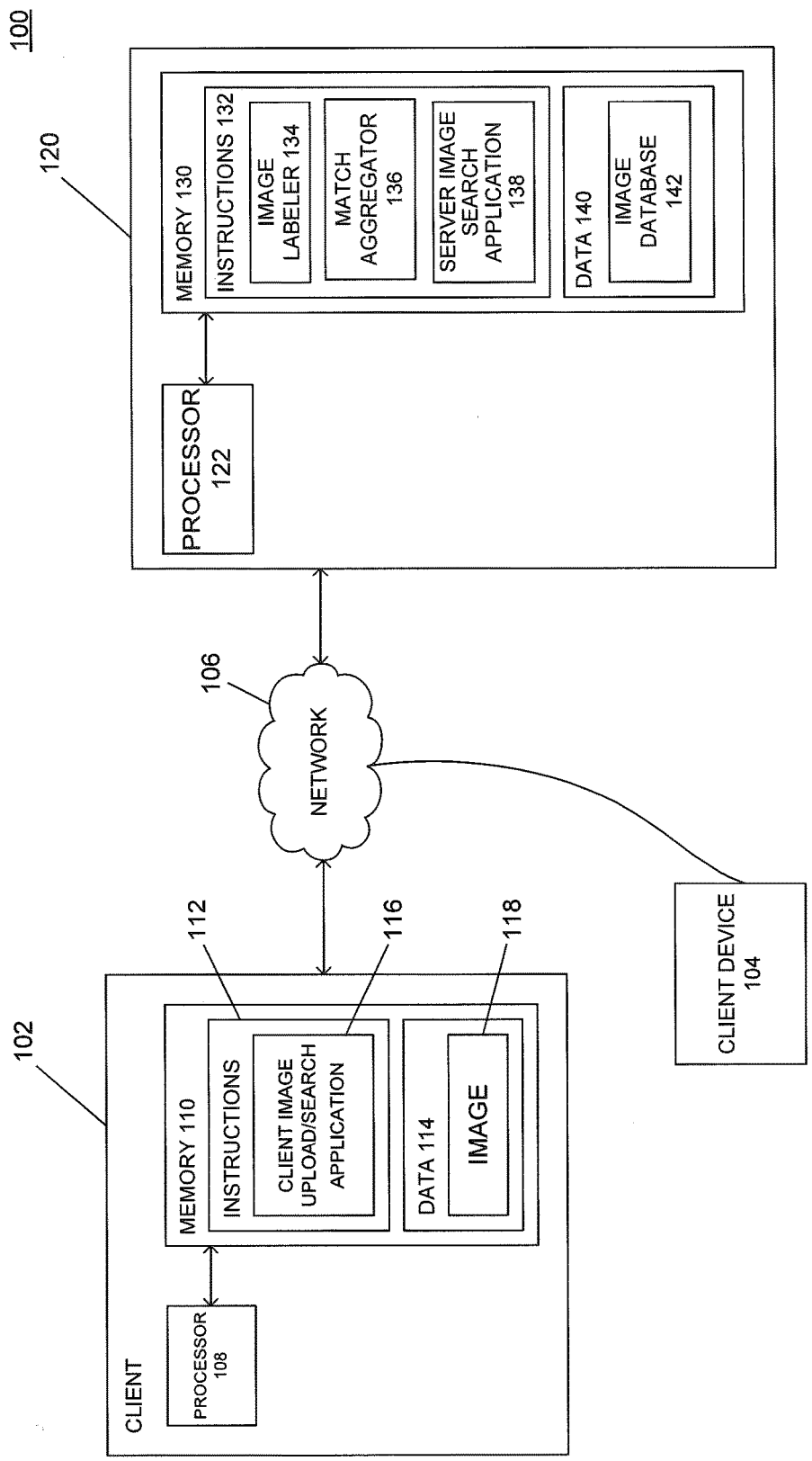
FIG. 1 is a system diagram depicting an example system in accordance with aspects of the subject matter disclosed herein.

FIG. 1 presents a schematic diagram of a computer system depicting various computing devices that can be used alone or in a networked configuration. For example, this Figure illustrates a computer network 100 with client devices 102, 104 and a server 120 in communication via a network 106. The client devices 102, 104 may be used to submit images or queries to the server 120, and to receive matched image results from the server 120. For example, one or more submitting users may submit images and accompanying labels to the server 120 using, for example, the client device 102. A second user ("querying user") may submit a query to the server 120 using, for example, the client device 104. The query may include an image of an object or other data for searching images. In response to the query, an image from the one or more submitting users may be matched with the query image, and a label associated with the matched image may be returned to the querying user.

The client devices 102, 104 can be computing devices, such as laptop computers, tablet computers, netbooks, rack-mounted servers, smartphones, cellular phones, video game systems, digital cameras/camcorders, or any other devices containing programmable hardware or software for executing instructions. The computing devices 102, 104 can be of the same type as one another or different. While the components of the client device 102 are explained in further detail below, the same components may be found in the client device 104.

The computing device 102 may include a processor 108, a memory 110 and other components typically present in general purpose computers. The memory 110 can store instructions 112 and data 114 that are accessible by the processor 108. The processor 108 may execute the instructions 112 and access the data 114 to control the operations of the client device 102.

The processor 108 may be any suitable processor, such as various commercially available general purpose processors. Alternatively, the processor 108 may be a dedicated controller such as an application-specific integrated circuit ("ASIC") or a field-programmable gate array ("FPGA").

The memory 110 may be any type of tangible memory operative to store information accessible by the processor 108, including a computer-readable medium, or other medium that stores data that can be read with the aid of an electronic device, such as a hard-drive, memory card, read-only memory ("ROM"), random access memory ("RAM"), digital versatile disc ("DVD") or other optical disks, as well as other write-capable and read-only memories. The system 100 can include different combinations of the foregoing, whereby different portions of the instructions and data are stored on different types of media.

Although FIG. 1 functionally illustrates the processor 108 and memory 110 as each being within a single block respectively, the processor 108 and memory 110 may actually be multiple processors and memories that may or may not be stored within the same physical housing. Accordingly, references to a processor, computer or memory may include references to a collection of processors, computers or memories that may or may not operate in parallel.

The instructions 112 may be any set of instructions to be executed directly (such as machine code) or indirectly (such as scripts) by the processor 108. For example, the instructions 112 may be stored as computer code on a non-transitory computer-readable medium. In that regard, the terms "instructions" and "programs" may be used interchangeably herein. The instructions 112 may be stored in object code format for direct processing by the processor 108, or in any other computer language including scripts or collections of independent source code modules that are interpreted on demand or compiled in advance. Functions, methods and routines of the instructions are explained in more detail below.

In order to facilitate the operations of the client device 102, the instructions 112 may comprise a client image upload/search application 116. The client image upload/search application 116 provides an interface by which the client device 102 may upload an image 118, stored in the data 114, to the server 120. An annotation or label may be uploaded along with the image 118 and associated with the image 118. The client image upload/search application 116 may also enable the client device 102 to perform image searches. For example, the user may upload the image 118 as a query for comparison to other images located on the server 120. Based on the results of such search, the client device may receive a label associated with a matched image. In this regard, the label should also correspond to the uploaded image in the query.

The client image upload/search application 116 may be any application suitable for the purpose of providing the image 118 to the server, such as a web browser displaying an image search web page, or an application installed on a desktop, laptop, or mobile phone. For example, the client device 102 may be a mobile phone that includes a camera module for capturing images. The user of the mobile phone may take a picture using the camera module, and submit the image 118 to perform the image search using an application installed on the mobile phone. In another aspect, the client device 102 may be a desktop computer with one or more images saved in memory. The user of the desktop computer may navigate to a website for performing image searches, and upload the image 118 from memory to the website.

Data 114 may be retrieved, stored, or modified by the processor 108 in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. The data may comprise any information sufficient to identify the relevant information, such as numbers, descriptive text, proprietary codes, references to data stored in other areas of the same memory or different memories (including other network locations) or information that is used by a function to calculate the relevant data.

The data 114 may store an image 118, for example, that was generated by the client device 102 or received from another source. For example, the image 118 may be generated by a camera module included in or coupled with the client device 102 or by an application executing on the client device 102, or the image may be received from an external source, such as over the network or via a removable storage device. The image 118 may be stored in any compressed or uncompressed format, including, but not limited to, GIF, JPEG, JPEG2000, BMP, TIF, or RAW. The image 118 may also be stored remotely, such as on a remote computer coupled to the client device 102 via the network 106, or on removable media.

The server 120 may receive images 118 or other information from the client devices 102, 104. For example, the server 120 may receive information to be used for labeling the images 118, search queries for other images, etc. The server 120 may use the information received from the client devices 102, 104 to associate labels with uploaded images, determine relationships between different images or labels, sort and organize images and associated labels based on the determined relationships, and provide search results to the client devices 102, 104.

The server 120 may be configured similarly to the client device 102, with a processor 122 coupled to a memory 130. The memory 130 may include a set of instructions 132 and data 140 to facilitate the operations of the server 120. The instructions 132 may include an image labeler 134, a match aggregator 136, and a server image search application 138. The data 140 may include an image database 142.

The image database 142 may include a number of database images, such as images uploaded using client devices

102, 104. Each database image may be associated with a label or other annotation corresponding to a content of the image. Although the image database 142 is shown as being in the same box as server 120, the image database 142 may actually be located external to the server 120. For example, the image database 142 may be maintained in a public manner in an open-source format.

The image labeler 134 associates labels with one or more images stored within the image database 142. The labels may include text strings that are associated with the images. The labels may be encoded in image metadata, or stored in a separate dataset and linked to the respective image. Labels may be associated with the images in a variety of manners. For example, the labels may be applied to the images by noting search queries in response to which the image is provided in an Internet search operation, the labels may be manually applied to the images by users, or the labels may be applied to the images using optical character recognition or other machine learning techniques.

The server image search application 138 functions to perform image search and analysis functions, such as identifying similar images and providing search results in response to receiving a query image. The server image search application 138 may interface with the client image search application 116 to perform image search operations. For example, the server image search application 138 may identify database images with similar objects, text, colors, or other features to a query image. Such analysis may use, for example, optical character recognition techniques or pixel-by-pixel comparison. According to one aspect, database images identified as potential query results can be assigned an image match score. The score may reflect, for example, a similarity of the database image to the query image.

The match aggregator 136 may perform a variety of tasks in connection with aggregating matches from the server image search application 138 and building resulting objects, for example, to be provided to the client device 104 as an image search result. The resulting objects may be labels, annotations, or other information associated with one or more database images matching a query image. According to some aspects, the match aggregator 136 may limit the results provided by contributors. For example, the results may be limited to one from each contributor. Where one contributor submits multiple different images, the image that most closely matches the query image, such as the database image with the highest image match score, may be selected as a potential resulting object. According to one example, contributors may be identified using a unique identifier, such as a username, an account number, a code associated with the user's computing device, or the like. Accordingly, only a highest scoring match per unique identifier may be selected for potential use as a result in response to a query. In situations in which the systems discussed here collect personal information about users, or may make use of personal information, the users may be provided with an opportunity to control whether programs or features collect user information (e.g., a user's current location. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The match aggregator 136 may also adjust scores based on a geographical location of a submitting user and/or a geographical location of a querying user. For example, the image match score for a database image may be increased as a function of a distance between a first location from which the database image was submitted and a second location, such as the current location of the querying user device. The shorter this distance, the greater a geo-boost factor to be multiplied with the image match score may be.

The match aggregator 136 may also group database image matches based on a similarity of their associated labels. According to one example, similarity of text labels may be measured using edit distance, such as Levenshtein distance, Hamming distance, or the like. According to another example, similar word meanings may be considered in grouping labels. For example, while the words "monument" and "memorial" may not have a close edit distance, they do have similar meanings. According to one aspect, pairs of labels with close edit distance or including words with similar meanings may be assigned a similarity score. Using a clustering strategy, such pairs of labels may be assigned to one or more groups. Each group may be a potential result to be returned to the user in response to the image query.

The match aggregator 136 may also rank the groups of potential results. Ranking may be performed by computing a group match score for each group. The group match score may be computed as the sum of all image match scores for the database images in that group. The result groups may then be sorted based on the group match score, and the group match scores may be normalized to derive a final score for a resulting object. Normalization may be performed by dividing the group match score by the number of matched images in the group having the highest group match score. In effect, the highest ranking group will have a final normalized score which is an average of all the image match scores in the group. Other groups will have a final normalized score that is proportionally lower. The group having the highest final normalized score may be returned to the querying user as a resulting object in response to the image query.

The client device 102, and the server 120 may each be at separate nodes of a network and be operative to directly and indirectly communicate with other nodes of the network 106. For example, the client device 102 may comprise a mobile phone that is operative to communicate with the server 120 via the network 106.

The network 106, and the intervening nodes between the client device 102 and the server 120 may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers. For example, the functionality of the server 120 may be spread across multiple nodes.

Although certain advantages are obtained when information is transmitted or received as noted above, other aspects of the subject matter described herein are not limited to any particular manner of transmission of information. For example, in some aspects, information may be sent via a medium such as an optical disk or portable drive. In other aspects, the information may be transmitted in a non-electronic format and manually entered into the system.

Figure 2:
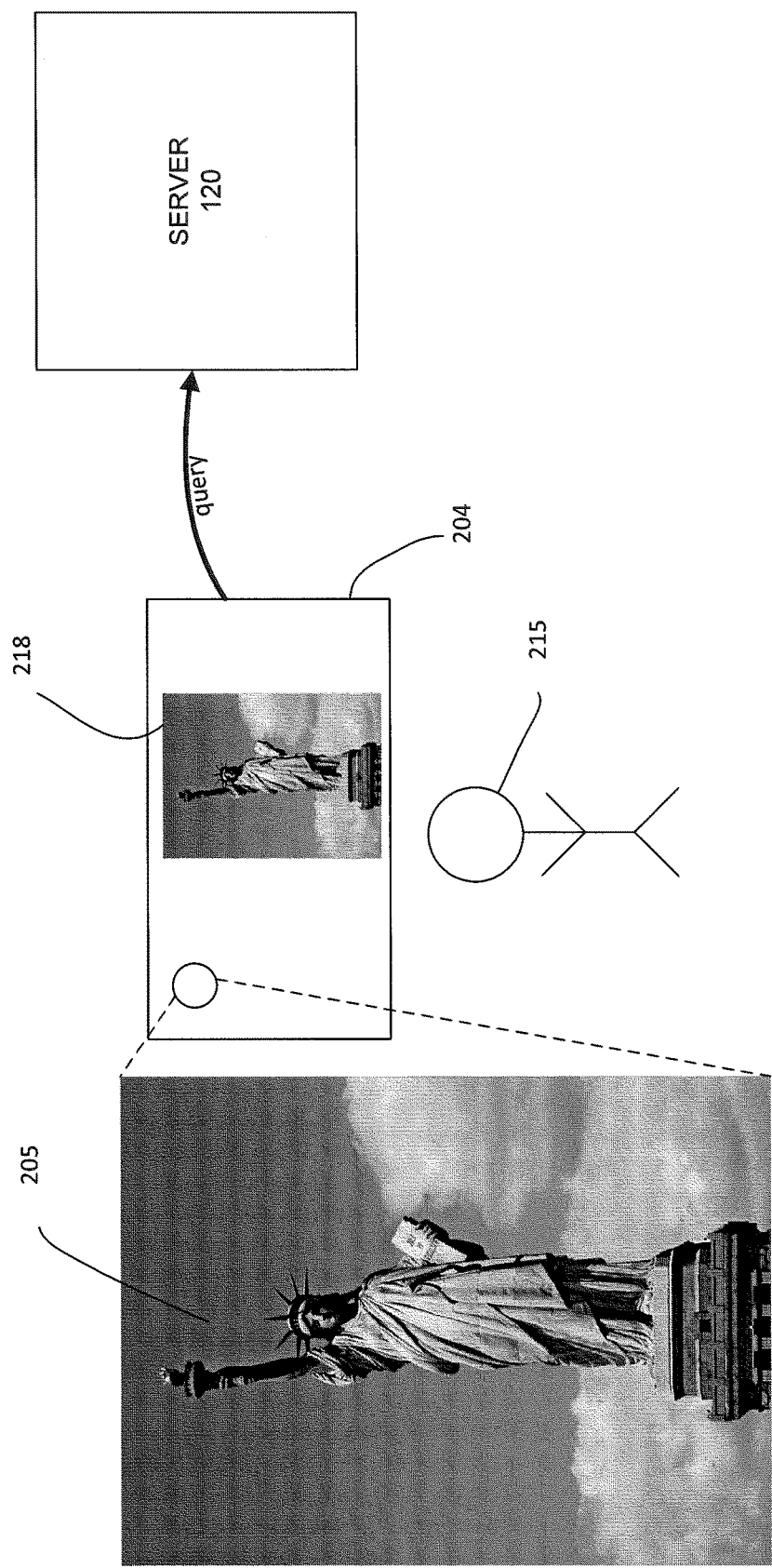
FIG. 2 is a pictorial diagram illustrating an example image query according to aspects of the subject matter disclosed herein.

FIG. 2 provides a pictorial diagram of a querying user 215 capturing a query image 218 of an object 205, such as the Statue of Liberty. The object 205 may be any entity, such as landmarks, street signs, store fronts, buildings, parks, people, etc. The image 218 may be stored on the user's computing device 204. The user 215 may submit the image 218 as a query to the server 120, for example, using an application such as the image upload/search application 116 of FIG. 1.

Figure 3:
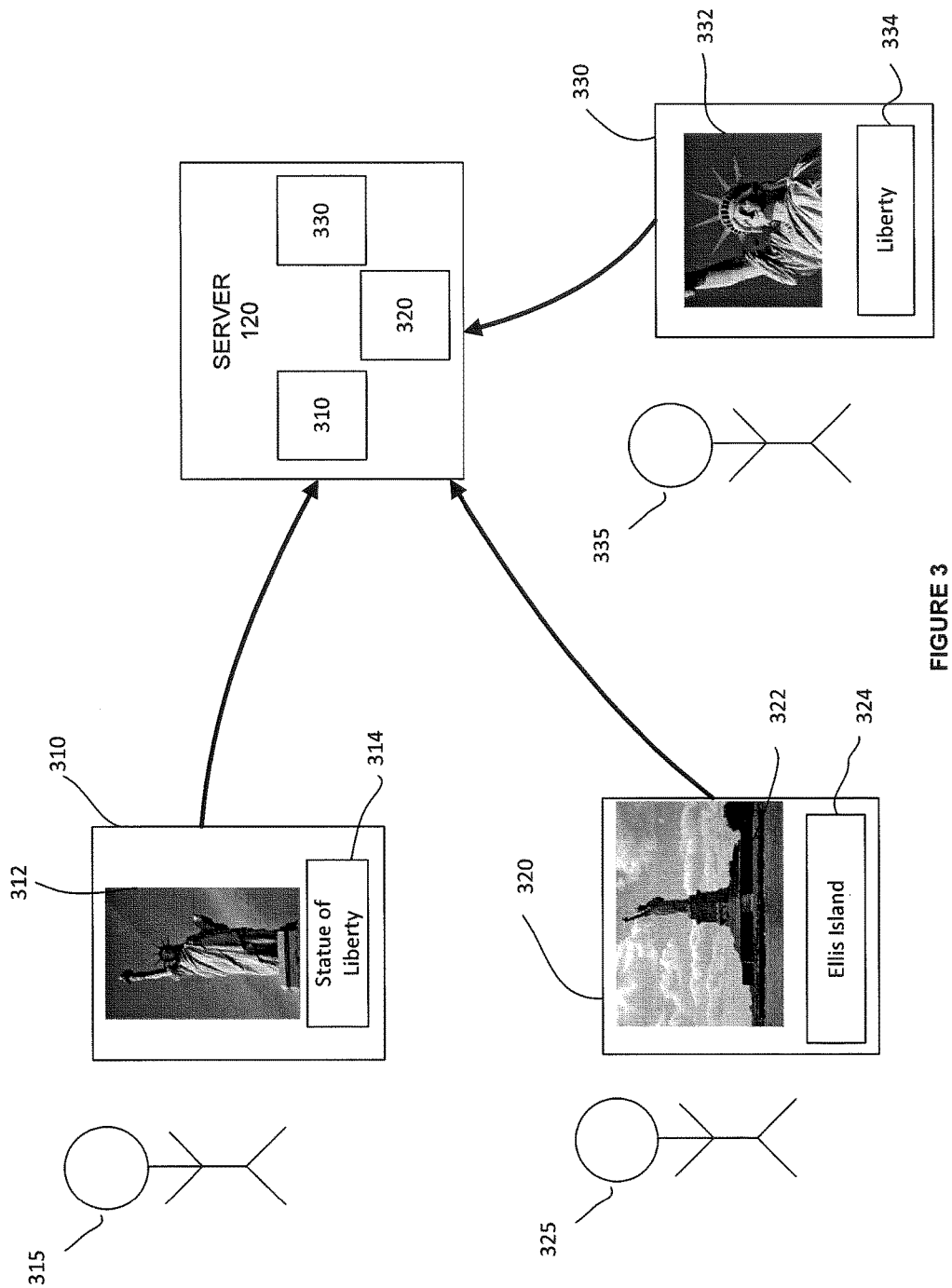
FIG. 3 is a pictorial diagram illustrating an example of multiple user content submissions according to aspects of the subject matter disclosed herein.

FIG. 3 provides a pictorial diagram illustrating a plurality of submitting users 315, 325, 335, each having a respective content submission 310, 320, 330. The content submissions 310, 320, 330 may be captured and submitted to the server 120 using any type of computing device. The content submissions 310, 320, 330 may respectively include images 312, 322, 332 and associated labels 314, 324, 334. The submissions may be made over any period of time and may be from any location. For example, the submitting user 315 may capture the image 312 of the Statue of Liberty using his mobile phone, and instantly upload the image to the server 120, for example, using the client image upload/search application 116 (FIG. 1). In contrast, the user 325 may have taken the image 322, stored it on his desktop computer, and submitted it a year earlier. As shown, while each of the images 312, 322, 332 may be similar, the labels 314, 324, 334 associated with each image may differ. For example, the label 314 indicates that the image 312 is the Statue of Liberty, while the label 324 of similar image 322 indicates that it is Ellis Island, and the label 334 indicates that the image 332 is "Liberty." The images 312, 322, 324 may be stored in communication with the server 120 along with the associated labels 314, 324, 334 as potential results for future queries, such as the query from the user 215 (FIG. 2).

Figure 4:
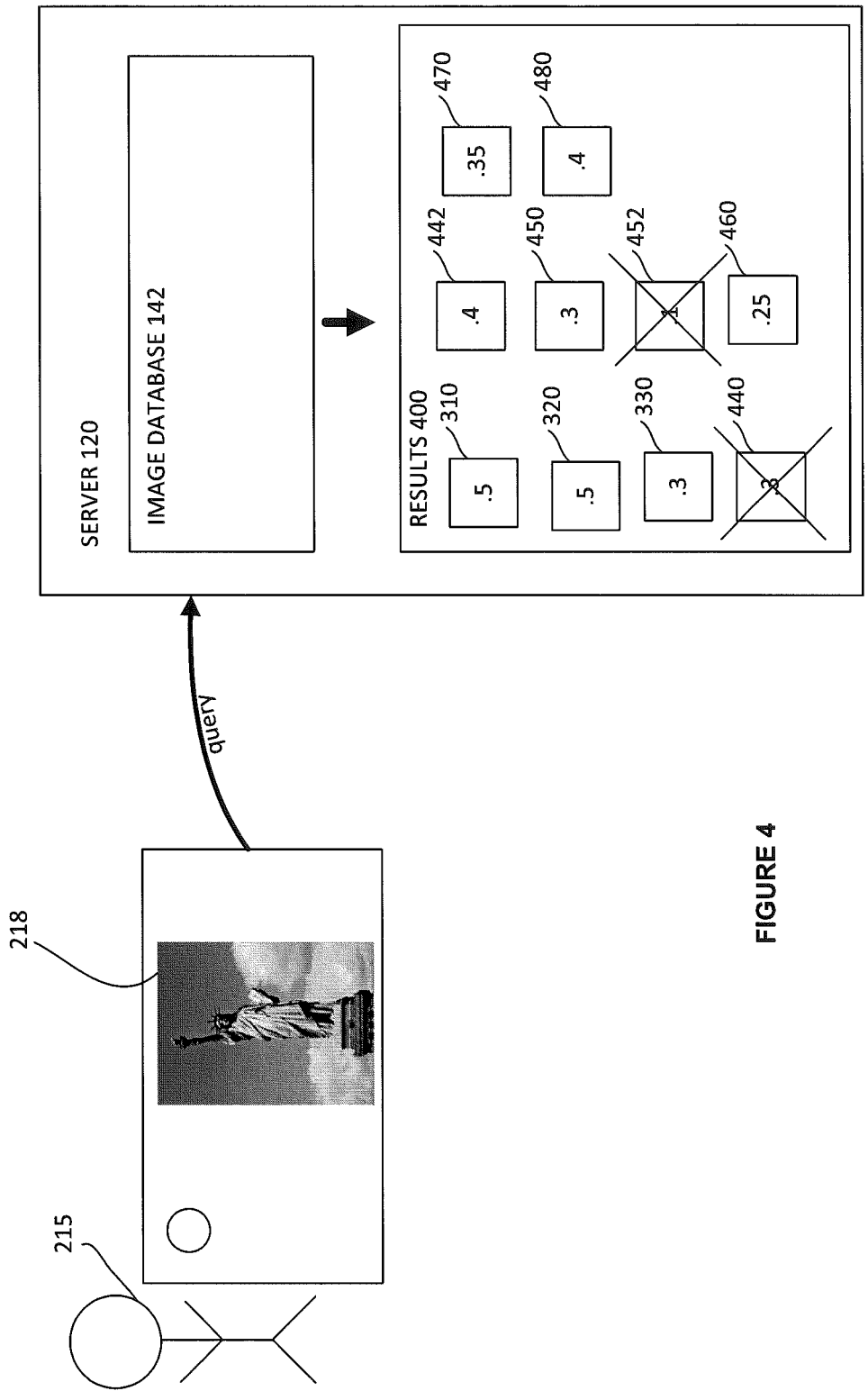
FIG. 4 is a pictorial diagram illustrating identification of multiple user submitted content results in response to an image query according to aspects of the subject matter disclosed herein.

FIG. 4 is a pictorial diagram of multiple user submitted results 400 which may be identified in response to the image query from the user 215. In this example, the results include the content submissions 310, 320, 330 from the users 315, 325, 335 (FIG. 3), along with a plurality of other submissions 440, 442, 450, 452, 460, 470, 480 from other users. Each submission may be assigned an image match score based on how closely its image matches the query image 218.

According to one example, the results 400 may be limited such that only one result is considered from each submitting user. The submitting user device may be identified, for example, using an identifier associated with the content submission. For example, it may be determined that submissions 440 and 442 were from a same submitting user device, and that submissions 450, 452 were from a same submitting user device. Accordingly, only one of the submissions 440, 442 may be included in the results 400, and only one of the submissions 450, 452 may be included in the results 400. The image match score for each submission may be considered in determining which submission to keep. For example, because the submission 442 has a higher image match score (0.4) than the submission 440 (0.3), the submission 442 may be selected for inclusion in the results 400. Similarly, because the submission 452 has an image score of 0.1, which is lower than the image match score of 0.3 of the submission 450, the submission 452 may be excluded from the results 400.

Figure 5:
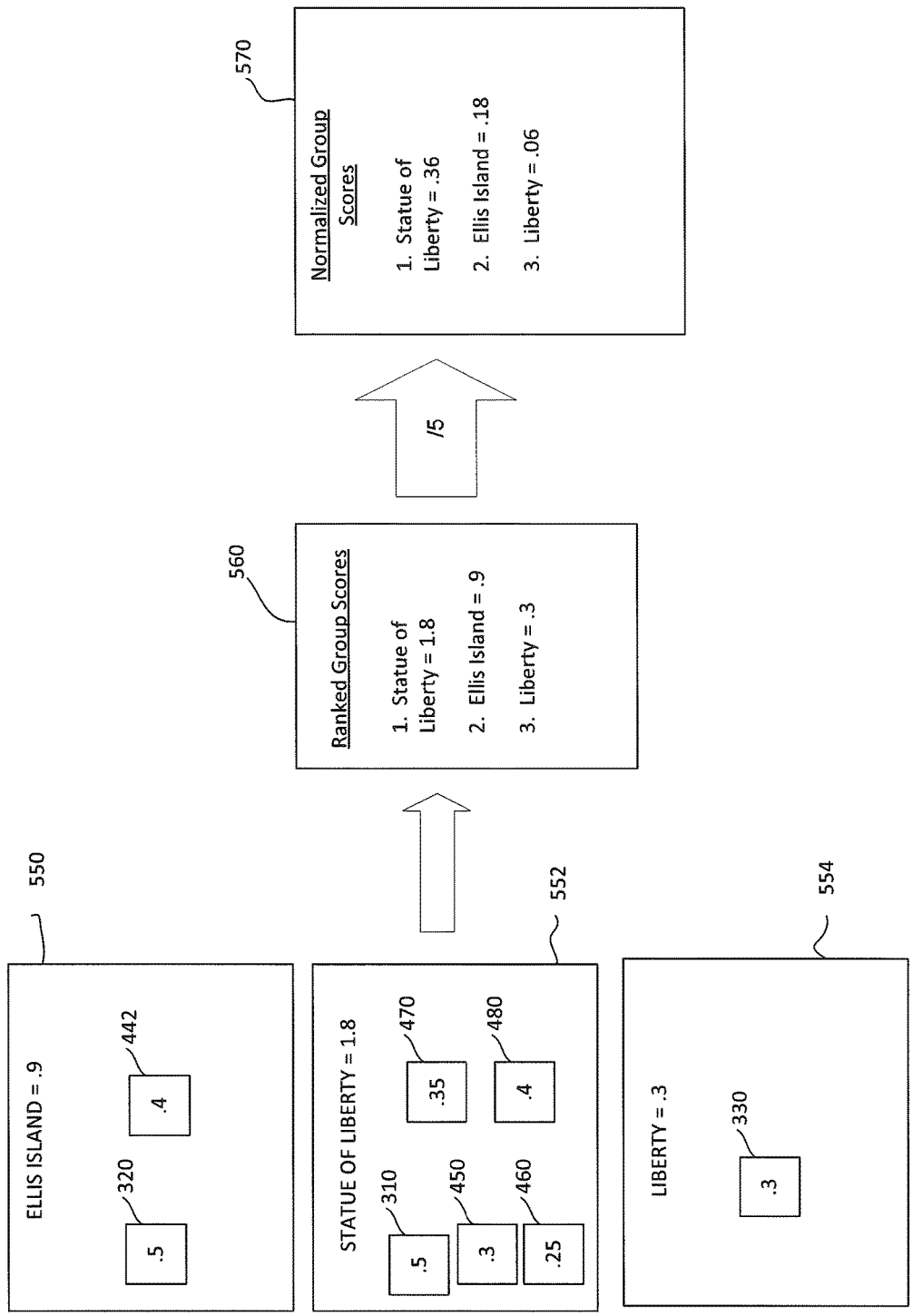
FIG. 5 is a block diagram illustrating grouping and sorting of the results of FIG. 4.

FIG. 5 is a block diagram illustrating individual results merged into groups, wherein those groups are issued a group score and sorted by group score. As mentioned above in connection with FIG. 1, labels associated with images may be compared and used to form groups of results. For example, labels associated with each of the content submissions 310, 320, 330, 442, 450, 460, 470, 480 in results 400 (FIG. 4) may be compared. The comparison may utilize techniques such as edit distance. Alternatively or additionally, the comparison may consider similarity of word meanings. Based on such comparison, groups 550, 552, 554 may be formed, with the content submissions in each group having similar labels. For example, in group 550 each of the content submissions 320, 442 may include a label for "Ellis Island." In the group 552, each of the content submissions 310, 450, 460, 470, 480 may include labels for "Statue of Liberty." The group 554 may include only one submission 330 having a label for "Liberty."

Each group 550, 552, 554 may be assigned a group score. The group score may be computed as the sum of all image match scores for content submissions in the group. Accordingly, in the example of FIG. 5, the group 550 has a group score of (0.5+0.4)=0.9, while the group 552 has a group score of (0.5+0.3+0.25+0.4+0.35)=1.8 and the group 554 has a group score of 0.3. The groups 550, 552, 554 may then be ranked by group score. For example, as shown in block 560, the group 552 has a highest group score, and thus a highest ranking, while the group 554 has a lowest group score, and thus a lowest ranking. These group scores may be normalized, for example, such that the highest scoring group's normalized score reflects an average of all the image match scores in the group. For example, because the highest scoring group 552 includes five content submissions, each of the group scores may be divided by 5. In this regard, the normalized score for the group 552 is 0.36, while the normalized score for the group 550 is 0.18 and the normalized score for the group 554 is 0.06.

Figure 6:
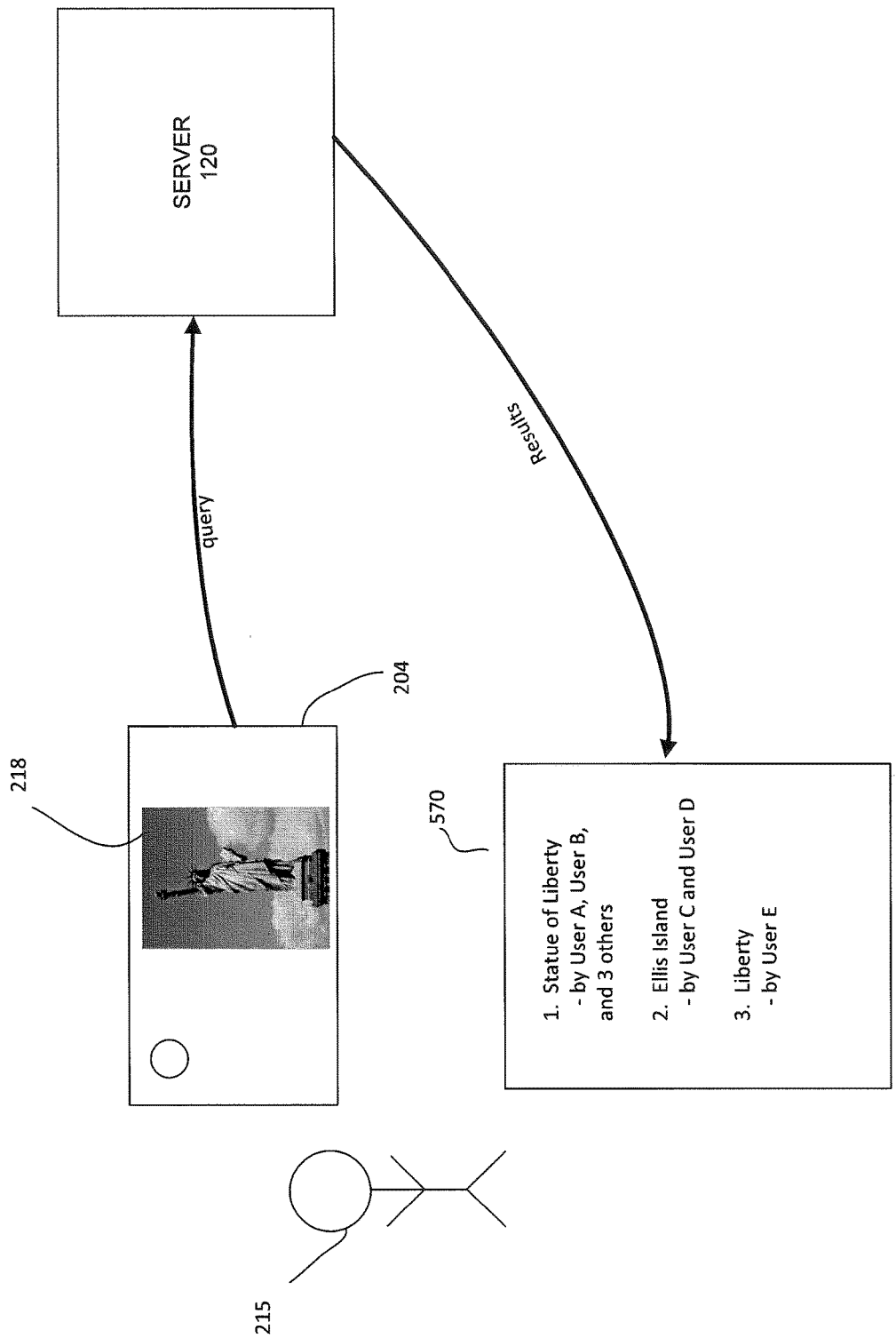
FIG. 6 is a pictorial diagram illustrating the grouped and sorted results that may be provided to the querying user device according to aspects of the subject matter disclosed herein.

FIG. 6 is a pictorial diagram illustrating a result of the image query of FIG. 2 being provided to the querying user 215. According to one example, the label "Statue of Liberty" corresponding to the highest scoring group 552 may be provided to the user 215. According to another example, the labels corresponding to each of the groups 550, 552, 554 may be provided to the user 215 along with an indication of which label is most popular. In this regard, the results may appear as in block 680. For example, the results may indicate how many submitting users provided the label corresponding to each group. Further, if the submitting user opted to provide information such as a username along with the content submission, this information may also be included in the results.

Figure 7:
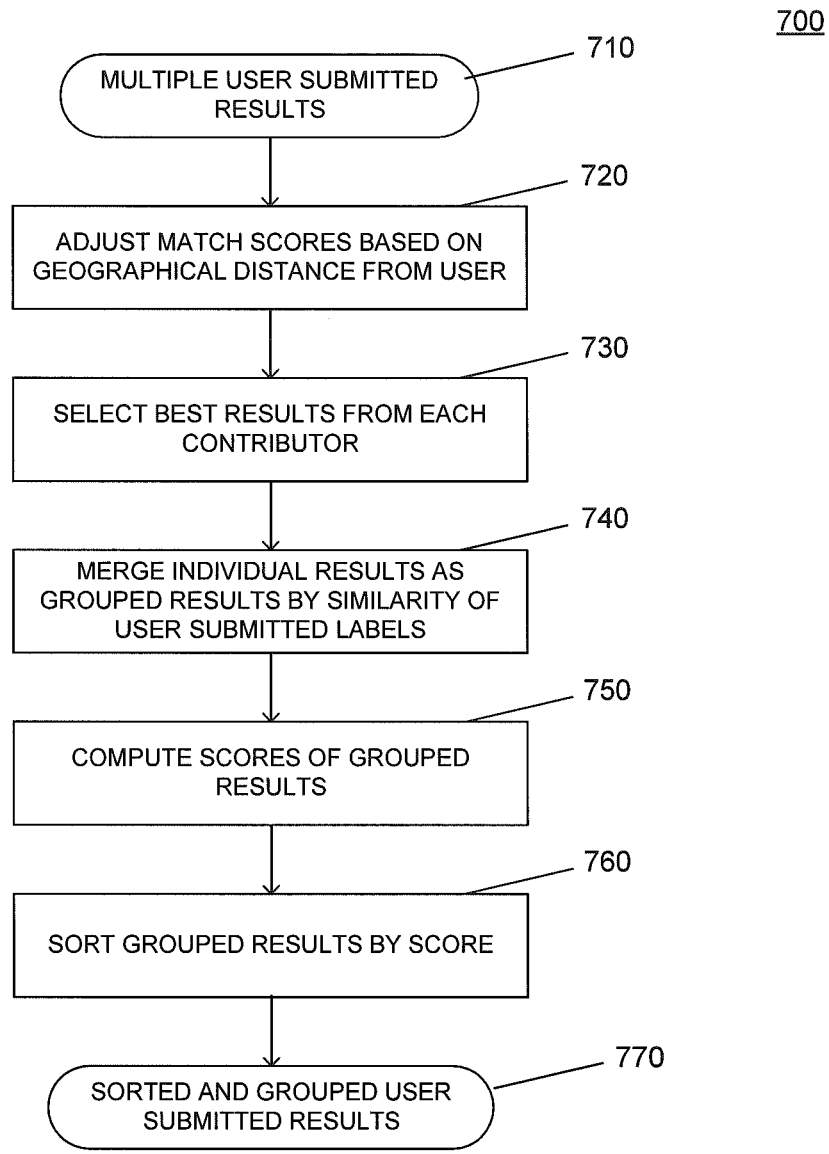
FIG. 7 is a flow diagram illustrating an example method of organizing multiple user submitted results according to aspects of the subject matter disclosed herein.

FIG. 7 is a flow diagram illustrating an example method 700 for sorting and grouping multiple user submitted images as image query results. For example, the method 700 may be performed as part of an image search operation, for example as shown in FIGS. 2-3, where a querying user submits a query image to a server for comparison against a database of previous user submitted images and labels. One or more results grouped and sorted according to the method 700 may be returned to the querying user in response to the query. While a number of stages are described in connection with the method 700 in a particular order, these stages may be performed in any order. Moreover, stages may be added or omitted.

Block 710 indicates multiple user submitted results. These results may be images and labels submitted to a computing device, such as the server 120. For example, the user submitted results 400 of FIG. 4 may be identified as potential matches to an image query.

In block 720 the match scores associated with the user submitted results may optionally be adjusted based on a geographical distance. For example, a distance between a first location from where the submitting user submitted the result and a second location from where the querying user sent the query may be determined. Alternatively or additionally, a distance between the first location from where the submitting user submitted the result and an actual location of an object, such as the object 205 of FIG. 2, in the result image may be determined. The match score for the result may be increased as a factor of closeness of the computed distance(s).

In block 730, a best result from each submitting user may be selected. For example, in some circumstances, one submitting user may provide multiple images of an object with a similar label for each. The images may be, for example, photographs taken at different angles, different formats such as video and still image, different file types such as .jpeg, .gif, .bmp, etc. In such circumstance, a result having an image which most closely matches the query image may be selected from that submitting user. According to aspects, a common identifier may be assigned to all results from a particular submitting user, such that it may be determined which results are from the same submitting user.

In block 740, individual results may be merged as grouped results. For example, the labels included in the user submitted results may be compared to one another. Results having similar labels may be merged into one group. The comparison of the labels may include an analysis of, for example, edit distance or similarity of words.

In block 750, scores of the grouped results may be computed. For example, as described in connection with FIG. 5, a group score for each group may be computed as a sum of all image match scores for the results in that group. The computed group score may further be normalized, for example, such that the normalized group score for the highest scoring group reflects an average of all the image match scores of the results in that group.

In block 760, the grouped results may be sorted by score. For example, the highest scoring group may be first in a list, while the lowest scoring group is last. Referring to the example of FIG. 6, the most popular result of "Statue of Liberty" may be first in a sorted list, while the least popular result of "Liberty" may be last.

Block 770 indicated the sorted and grouped user submitted results. Such results may be provided to the querying user in response to the query. Moreover, such results may be stored, for example, for further analysis or other future use.

Figure 8:
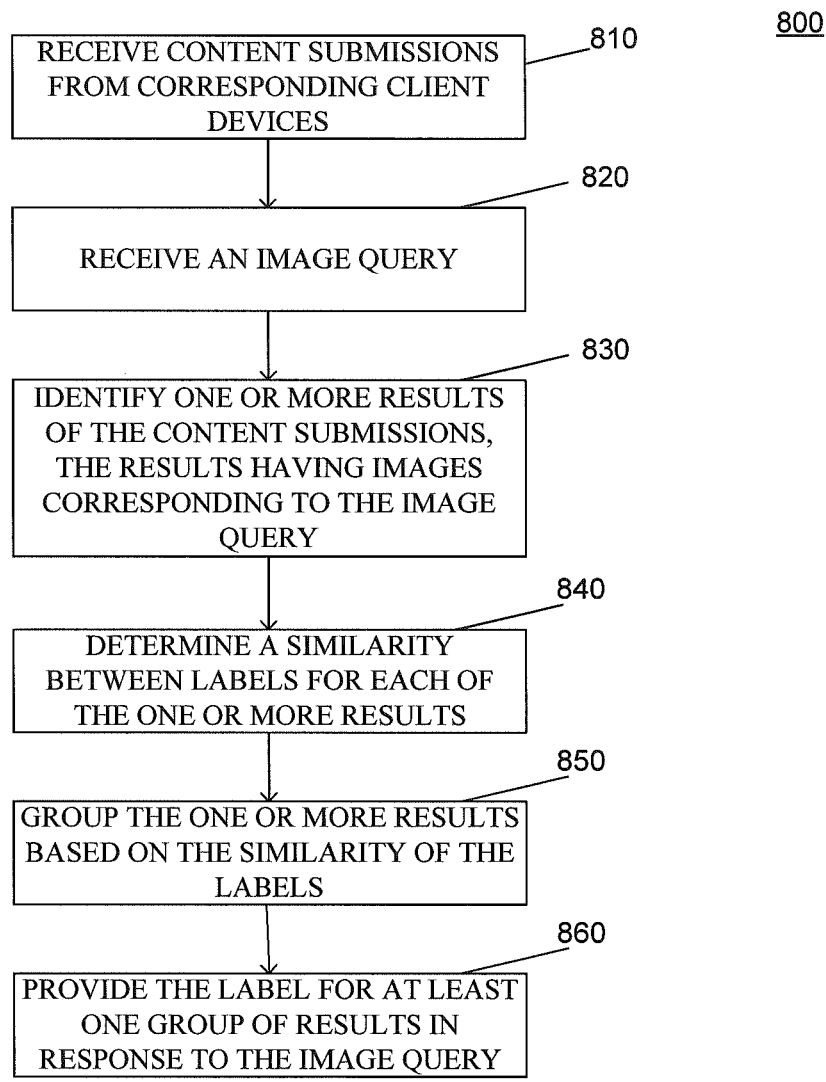
FIG. 8 is a flow diagram illustrating an example method of providing user submitted results in response to an image query according to aspects of the subject matter disclosed herein.

FIG. 8 is a flow diagram illustrating an example method of providing user submitted results in response to an image query. In block 810, content submissions are receiving from corresponding client devices. Each content submission may include an image and an associated label.

In block 820, an image query may be received. For example, a user device may send an image to a server so as to request information regarding the contents of the image. For example a tourist may capture an image of a nearby monument, and submit an image query to identify the monument.

In block 830, one or more results are identified from among the content submissions. The results may include images which correspond to the image query.

In block 840, a similarity between labels may be determined for each of the results identified in block 830. In block 850, the one or more results are grouped based on the similarity of the labels.

In block 860, a response to the image query is provided. For example, the label for at least one group of results may be sent to the user device that submitted the image query. According to some examples, additional information may be provided, such as the number of client devices that provided content submissions having the same label. Moreover, the labels for multiple groups of results may be provided.

The systems and methods described herein advantageously provide for accurate and concise presentation of information from a set of multiple user submitted results for a task of object identification. A querying user may not only be provided with a variety of results corresponding to an object in an image query, but the user may also be provided with information as to which results are most popular. Such information allows the querying user to quickly and easily determine what the object is and potentially where the user is located.

As these and other variations and combinations of the features described above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method comprising:
receiving a search query from a particular user, wherein the search query includes a query image;
obtaining a set of submitted images that (i) were submitted by one or more other users, and (ii) are identified as similar to the query image that is included in the search query;
determining, for each submitted image of the set of submitted images that were submitted by the one or more other users and are identified as similar to the query image that is included in the search query, (i) a query relevance score that reflects a relevance of the submitted image to the query image and (ii) an annotation associated with the submitted image;
grouping the submitted images of the set of submitted images by the annotations associated with the submitted images that were submitted by the one or more other users;
for each group of images in the set of submitted images that were submitted by the one or more other users, aggregating the query relevance scores that reflect the relevance of the submitted images in the group of images to the query image;
selecting a particular group of images based on the aggregated query relevance scores that reflect the relevance of the submitted images in the groups of images to the query image; and
providing one or more images of the particular group of images that is selected for output to the particular user on a search results page in response to the search query.

2. The method of claim 1, wherein grouping the submitted images of the set of submitted images by the annotations associated with the submitted images that were submitted by the one or more other users is based on determining edit distances or similar meanings between the annotations.

3. The method of claim 1, wherein obtaining a set of submitted images that (i) were submitted by one or more other users, and (ii) are identified as similar to the query image that is included in the search query comprises:
determining that multiple images obtained by another user are visually similar to the query image; and
in response to determining that multiple image obtained by the other user are visually similar to the query image, selecting one of the multiple images obtained by the other user to include in the set of submitted images.

4. The method of claim 1, wherein obtaining a set of submitted images that (i) were submitted by one or more other users, and (ii) are identified as similar to the query image that is included in the search query is based on geographical locations where the one or more users submitted the submitted image.

5. The method of claim 1, wherein determining, for each submitted image of the set of submitted images that were submitted by the one or more other users and are identified as similar to the query image that is included in the search query, (i) a query relevance score that reflects a relevance of the submitted image to the query image and (ii) an annotation associated with the submitted image comprises:
   determining the query relevance score that reflects the relevance of the submitted image to the query image based at least on (i) a visual similarity between the submitted image and the query image and (ii) a geographic distance between a location reflecting a submission of the submitted image and a location of the particular user.

6. The method of claim 1, wherein selecting a particular group of images based on the aggregated query relevance scores that reflect the relevance of the submitted images in the groups of images to the query image comprises:
   determining that the particular group of images has an aggregated query relevance score that reflects more relevance than the aggregated query relevance scores of the other groups of images; and
   in response to determining that the particular group of images has an aggregated query relevance score that reflects more relevance than the aggregated query relevance scores of the other groups of images, selecting the particular group of images.

7. The method of claim 1, wherein providing one or more images of the particular group of images that is selected for output to the particular user on a search results page in response to the search query comprises:
   providing in the search results page an indication of the number of submitted images in the particular group of images.

8. A system comprising:
   one or more computers and one or more storage devices storing instructions that are operable, when executed by the one or more computers, to cause the one or more computers to perform operations comprising:
   receiving a search query from a particular user, wherein the search query includes a query image;
   obtaining a set of submitted images that (i) were submitted by one or more other users, and (ii) are identified as similar to the query image that is included in the search query;
   determining, for each submitted image of the set of submitted images that were submitted by the one or more other users and are identified as similar to the query image that is included in the search query, (i) a query relevance score that reflects a relevance of the submitted image to the query image and (ii) an annotation associated with the submitted image;
   grouping the submitted images of the set of submitted images by the annotations associated with the submitted images that were submitted by the one or more other users;
   for each group of images in the set of submitted images that were submitted by the one or more other users, aggregating the query relevance scores that reflect the relevance of the submitted images in the group of images to the query image;
   selecting a particular group of images based on the aggregated query relevance scores that reflect the relevance of the submitted images in the groups of images to the query image; and
   providing one or more images of the particular group of images that is selected for output to the particular user on a search results page in response to the search query.

9. The system of claim 8, wherein grouping the submitted images of the set of submitted images by the annotations associated with the submitted images that were submitted by the one or more other users is based on determining edit distances or similar meanings between the annotations.

10. The system of claim 8, wherein obtaining a set of submitted images that (i) were submitted by one or more other users, and (ii) are identified as similar to the query image that is included in the search query comprises:
    determining that multiple images obtained by another user are visually similar to the query image; and
    in response to determining that multiple image obtained by the other user are visually similar to the query image, selecting one of the multiple images obtained by the other user to include in the set of submitted images.

11. The system of claim 8, wherein obtaining a set of submitted images that (i) were submitted by one or more other users, and (ii) are identified as similar to the query image that is included in the search query is based on geographical locations where the one or more users submitted the submitted image.

12. The system of claim 8, wherein determining, for each submitted image of the set of submitted images that were submitted by the one or more other users and are identified as similar to the query image that is included in the search query, (i) a query relevance score that reflects a relevance of the submitted image to the query image and (ii) an annotation associated with the submitted image comprises:
    determining the query relevance score that reflects the relevance of the submitted image to the query image based at least on (i) a visual similarity between the submitted image and the query image and (ii) a geographic distance between a location reflecting a submission of the submitted image and a location of the particular user.

13. The system of claim 8, wherein selecting a particular group of images based on the aggregated query relevance scores that reflect the relevance of the submitted images in the groups of images to the query image comprises:
    determining that the particular group of images has an aggregated query relevance score that reflects more relevance than the aggregated query relevance scores of the other groups of images; and
    in response to determining that the particular group of images has an aggregated query relevance score that reflects more relevance than the aggregated query relevance scores of the other groups of images, selecting the particular group of images.

14. The system of claim 8, wherein providing one or more images of the particular group of images that is selected for output to the particular user on a search results page in response to the search query comprises:
    providing in the search results page an indication of the number of submitted images in the particular group of images.

15. A non-transitory computer-readable medium storing software comprising instructions executable by one or more computers which, upon such execution, cause the one or more computers to perform operations comprising:

receiving a search query from a particular user, wherein the search query includes a query image;

obtaining a set of submitted images that (i) were submitted by one or more other users, and (ii) are identified as similar to the query image that is included in the search query;

determining, for each submitted image of the set of submitted images that were submitted by the one or more other users and are identified as similar to the query image that is included in the search query, (i) a query relevance score that reflects a relevance of the submitted image to the query image and (ii) an annotation associated with the submitted image;

grouping the submitted images of the set of submitted images by the annotations associated with the submitted images that were submitted by the one or more other users;

for each group of images in the set of submitted images that were submitted by the one or more other users, aggregating the query relevance scores that reflect the relevance of the submitted images in the group of images to the query image;

selecting a particular group of images based on the aggregated query relevance scores that reflect the relevance of the submitted images in the groups of images to the query image; and providing one or more images of the particular group of images that is selected for output to the particular user on a search results page in response to the search query.

16. The medium of claim 15, wherein grouping the submitted images of the set of submitted images by the annotations associated with the submitted images that were submitted by the one or more other users is based on determining edit distances or similar meanings between the annotations.

17. The medium of claim 15, wherein obtaining a set of submitted images that (i) were submitted by one or more other users, and (ii) are identified as similar to the query image that is included in the search query comprises:

determining that multiple images obtained by another user are visually similar to the query image; and in response to determining that multiple image obtained by the other user are visually similar to the query image, selecting one of the multiple images obtained by the other user to include in the set of submitted images.

18. The medium of claim 15, wherein obtaining a set of submitted images that (i) were submitted by one or more other users, and (ii) are identified as similar to the query image that is included in the search query is based on geographical locations where the one or more users submitted the submitted image.

19. The medium of claim 15, wherein determining, for each submitted image of the set of submitted images that were submitted by the one or more other users and are identified as similar to the query image that is included in the search query, (i) a query relevance score that reflects a relevance of the submitted image to the query image and (ii) an annotation associated with the submitted image comprises:

determining the query relevance score that reflects the relevance of the submitted image to the query image based at least on (i) a visual similarity between the submitted image and the query image and (ii) a geographic distance between a location reflecting a submission of the submitted image and a location of the particular user.

20. The medium of claim 15, wherein selecting a particular group of images based on the aggregated query relevance scores that reflect the relevance of the submitted images in the groups of images to the query image comprises:

determining that the particular group of images has an aggregated query relevance score that reflects more relevance than the aggregated query relevance scores of the other groups of images; and in response to determining that the particular group of images has an aggregated query relevance score that reflects more relevance than the aggregated query relevance scores of the other groups of images, selecting the particular group of images.

* * * * *